United States Patent
Takahashi

(10) Patent No.: US 9,425,579 B2
(45) Date of Patent: Aug. 23, 2016

(54) OPTICAL FIBER COUPLER AND OPTICAL FIBER AMPLIFIER

(71) Applicant: FUJIKURA LTD., Tokyo (JP)

(72) Inventor: Minoru Takahashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/564,302

(22) Filed: Dec. 9, 2014

(65) Prior Publication Data

US 2015/0180195 A1 Jun. 25, 2015

Related U.S. Application Data

(62) Division of application No. 12/787,051, filed on May 25, 2010, now Pat. No. 8,934,167.

(30) Foreign Application Priority Data

May 25, 2009 (JP) .................... 2009-125764

(51) Int. Cl.
*H01S 3/067* (2006.01)
*G02B 6/255* (2006.01)
(Continued)

(52) U.S. Cl.
CPC .......... *H01S 3/06783* (2013.01); *G02B 6/2551* (2013.01); *G02B 6/262* (2013.01); *H01S 3/091* (2013.01); *H01S 3/094003* (2013.01); *G02B 6/2826* (2013.01); *H01S 3/094007* (2013.01); *H01S 3/094019* (2013.01)

(58) Field of Classification Search
CPC ............... G02B 6/02042; G02B 6/036; G02B 6/03633; G02B 6/14; G02B 6/2821; H01S 3/06783; H01S 3/094007; H01S 3/094019
See application file for complete search history.

(56) References Cited

U.S. PATENT DOCUMENTS 4,474,431 A * 10/1984 Bricheno ............. G02B 6/2821
385/24
4,815,079 A 3/1989 Snitzer et al.
(Continued)

FOREIGN PATENT DOCUMENTS

JP  64-080914 A  3/1989
JP  03-233411 A  10/1991
(Continued)

OTHER PUBLICATIONS

Japanese Office Action mailed Mar. 26, 2013, issued in corresponding Japanese Patent Application No. 2009-125764 (2 pages).
(Continued)

*Primary Examiner* — Eric Bolda
(74) *Attorney, Agent, or Firm* — Westerman, Hattori, Daniels & Adrian, LLP

(57) ABSTRACT

An optical fiber coupler in which damage to a pumping light source can be suppressed even if signal light leaks and an optical fiber amplifier using the optical fiber coupler are provided. An optical fiber coupler includes: a first optical fiber having a core and a clad coating the core; a second optical fiber having a core; and a fusion-drawn portion formed by arranging the first optical fiber and the second optical fiber so that their longitudinal directions are in the same direction and fusing the clad of the first optical fiber and the core of the second optical fiber. The clad of the first optical fiber has a larger refractive index than the core of the second optical fiber.

11 Claims, 8 Drawing Sheets

(51) Int. Cl.
  *G02B 6/26* (2006.01)
  *G02B 6/28* (2006.01)
  *H01S 3/094* (2006.01)
  *H01S 3/091* (2006.01)

(56) References Cited

U.S. PATENT DOCUMENTS

| | | | |
|---|---|---|---|
| 4,828,350 | A | 5/1989 | Kim et al. |
| 5,108,183 | A | 4/1992 | Fling et al. |
| 5,119,229 | A | 6/1992 | Grasso et al. |
| 5,864,644 | A | 1/1999 | DiGiovanni et al. |
| 5,999,673 | A | 12/1999 | Valentin et al. |
| 6,434,295 | B1 | 8/2002 | MacCormack et al. |
| 7,046,432 | B2 | 5/2006 | Starodoumov |
| 2008/0298746 | A1* | 12/2008 | Holehouse ............ G02B 6/2821 385/43 |

FOREIGN PATENT DOCUMENTS

| | | | |
|---|---|---|---|
| JP | 03-287113 | A | 12/1991 |
| JP | 10-511779 | A | 11/1998 |
| JP | 2980248 | B2 | 11/1999 |
| JP | 2000-101174 | A | 4/2000 |
| JP | 2001-144350 | A | 5/2001 |
| JP | 2001-196666 | A | 7/2001 |
| JP | 2004-309637 | A | 11/2004 |
| JP | 2004-537167 | A | 12/2004 |
| WO | 96/20519 | A1 | 7/1996 |
| WO | 00/67350 | A1 | 11/2000 |
| WO | 03/010579 | A1 | 2/2003 |

OTHER PUBLICATIONS

U.S. Office Action dated Feb. 28, 2013, issued in corresponding U.S. Appl. No. 12/787,051.

U.S. Office Action dated Aug. 1, 2013, issued in corresponding U.S. Appl. No. 12/787,051.

U.S. Office Action dated Mar. 27, 2014, issued in corresponding U.S. Appl. No. 12/787,051.

U.S. Notice of Allowance dated Sep. 10, 2014, issued in corresponding U.S. Appl. No. 12/787,051.

* cited by examiner

OPTICAL FIBER COUPLER AND OPTICAL FIBER AMPLIFIER

This application is a divisional of U.S. application Ser. No. 12/787,051 filed on May 25, 2010, which is based upon and claims the benefit of priority of the prior Japanese Patent Application No. 2009-125764, filed on May 25, 2009, the entire contents of which are incorporated herein by reference.

TECHNICAL FIELD

The invention relates to an optical fiber coupler and an optical fiber amplifier.

BACKGROUND ART

In an optical amplifier, a fiber laser device, and the like, a clad pump structure using an amplifying optical fiber having a core doped with rare earth elements is typically employed. The clad pump structure is a structure to which pumping light necessary for amplifying light propagating through a core in an optical fiber propagates and is supplied through a clad.

In order to supply signal light and pumping light to the amplifying optical fiber, an optical fiber coupler is used in some cases. In the optical fiber coupler, a single mode fiber through which the signal light can propagate as single mode light and a multimode fiber through which the pumping light can propagate are fused and drawn to form a fusion-drawn portion.

Patent Document 1 listed below describes an example of an optical fiber coupler and the optical fiber amplifier using the optical fiber coupler. In the optical fiber coupler used for the optical fiber amplifier, a single mode fiber and a multimode fiber are twisted together and fused and drawn to form a fusion-drawn portion. If signal light propagating as single mode light through the single mode fiber and pumping light propagating as multimode light through the multimode fiber are input to the optical fiber coupler, they propagate as the single mode light and the multimode light, respectively, and are input to an amplifying optical fiber from the optical fiber coupler.

Patent Document 1: Japanese Patent No. 2980248

SUMMARY OF INVENTION

In the optical fiber coupler in which the fusion-drawn portion is formed, part of the signal light from the core of the single mode fiber in the fusion-drawn portion may leak in some cases. In other cases, in a junction between the optical fiber coupler and the amplifying optical fiber, part of the signal light may reflect, leak from the core of the single mode fiber, and return to the fusion-drawn portion.

In the optical fiber amplifier described in Patent Document 1 listed above, the single mode fiber and the multimode fiber are twisted together to form the fusion-drawn portion and therefore the signal light that has leaked from the core of the single mode fiber may repeat reflecting intricately and may be input to the multimode fiber in some cases. In this case, the leaking signal light may be input to an pumping light source via the multimode fiber and damage the pumping light source.

Therefore, an object of the invention is to provide an optical fiber coupler in which damage to an pumping light source can be suppressed even if signal light leaks and an optical fiber amplifier using the optical fiber coupler.

To attain the object, the inventors studied an optical fiber coupler in which a fusion-drawn portion is made up of a first optical fiber having a core, a clad coating the core, and a plastic clad coating the clad and a second optical fiber having a core and a plastic clad coating the core. In the first optical fiber, signal light can propagate through the core and the pumping light can propagate through the clad. In the second optical fiber, the pumping light can propagate through the core. The fusion-drawn portion is not formed by twisting the first optical fiber and the second optical fiber together but is formed by arranging the first optical fiber and the second optical fiber so that their longitudinal directions are in the same direction, exposing the clad at a portion of the first optical fiber, exposing the core at a portion of the second optical fiber, and fusing the clad of the first optical fiber and the core of the second optical fiber.

With this structure, twisting the single mode fiber and the multimode fiber together in the optical fiber coupler according to Patent Document 1 is eliminated. Consequently, the inventors considered that input of the signal light leaking from the core of the first optical fiber to the core of the second optical fiber would be suppressed and that the problem described above would be solved.

However, even with the optical fiber coupler having such a structure, it was found through the study of the inventors that the input of the signal light leaking from the core of the first optical fiber to the core of the second optical fiber could not be suppressed in some cases. Therefore, the inventors have studied intensively so as to make the invention.

Specifically, the invention is an optical fiber coupler including: a first optical fiber having a core and a clad coating the core, signal light being capable of propagating through the core and pumping light being capable of propagating through the clad; a second optical fiber having a core, the pumping light being capable of propagating through the core; and a fusion-drawn portion formed by arranging the first optical fiber and the second optical fiber so that their longitudinal directions are in the same direction and fusing the clad of the first optical fiber and the core of the second optical fiber. The clad of the first optical fiber has a larger refractive index than the core of the second optical fiber.

According to such an optical fiber coupler, the signal light input to the first optical fiber propagates through the core of the first optical fiber and the pumping light input to the second optical fiber propagates through the second optical fiber. The fusion-drawn portion is formed by arranging the first optical fiber and the second optical fiber so that their longitudinal directions are in the same direction and fusing the clad of the first optical fiber and the core of the second optical fiber. Moreover, the clad of the first optical fiber is configured to have the larger refractive index than the core of the second optical fiber. As a result, the light is liable to propagate from the second optical fiber to the first optical fiber. Therefore, the pumping light propagating through the second optical fiber is liable to be input to the first optical fiber in the fusion-drawn portion and the pumping light input to the first optical fiber propagates through the first optical fiber. On the other hand, if the light is to propagate from the first optical fiber to the second optical fiber, the light is liable to be confined to the first optical fiber side of the interface between the first optical fiber and the second optical fiber because the clad of the first optical fiber has the larger refractive index than the core of the second optical fiber. Therefore, if the signal light propagating through the core of the first optical fiber leaks, input of the leaking signal light to the second optical fiber can be suppressed. Consequently, input of the signal light leaking from the first optical fiber to the pumping light source via the second optical fiber can be suppressed.

Further, the invention is an optical fiber coupler including: a first optical fiber having a core, an inner clad coating the core, and an outer clad coating the inner clad and having a smaller refractive index than the inner clad, signal light being capable of propagating through the core and pumping light being capable of propagating through the inner clad and the outer clad; a second optical fiber having a core, the pumping light being capable of propagating through the core; and a fusion-drawn portion formed by arranging the first optical fiber and the second optical fiber so that their longitudinal directions are in the same direction and fusing the outer clad of the first optical fiber and the core of the second optical fiber. The outer clad of the first optical fiber has a refractive index not smaller than that of the core of the second optical fiber.

According to such an optical fiber coupler, the fusion-drawn portion is formed by arranging the first optical fiber and the second optical fiber so that their longitudinal directions are in the same direction and fusing the outer clad of the first optical fiber and the core of the second optical fiber. The outer clad of the first optical fiber is configured to have the refractive index not smaller than that of the core of the second optical fiber. Therefore, in the fusion-drawn portion, the light is liable to propagate from the second optical fiber to the first optical fiber. As a result, the pumping light propagating through the second optical fiber is liable to be input to the first optical fiber and the pumping light input to the first optical fiber propagates through the first optical fiber. On the other hand, the inner clad of the first optical fiber has the larger refractive index than the outer clad. Therefore, even if the signal light propagating through the core of the first optical fiber leaks, the leaking light is liable to be confined to the inner clad side of the interface between the inner clad and the outer clad in the first optical fiber and propagation of the light from the inner clad to the outer clad of the first optical fiber is suppressed. Therefore, the propagation of the signal light, which is leaking from the core of the first optical fiber, from the inner clad to the outer clad is suppressed and input of the signal light to the second optical fiber is suppressed. Consequently, input of the signal light leaking from the core of the first optical fiber to the pumping light source via the second optical fiber can be suppressed.

In the optical fiber coupler described above, it is preferable that the outer clad of the first optical fiber has a larger refractive index than the core of the second optical fiber.

With this structure, the propagation of the light from the inner clad to the outer clad of the first optical fiber is suppressed and the propagation of the light from the outer clad of the first optical fiber to the clad of the second optical fiber is suppressed. Therefore, the propagation of the signal light leaking from the core of the first optical fiber to the second optical fiber is further suppressed.

An optical fiber amplifier according to the invention includes: the optical fiber coupler described above; an input portion connected on one side with respect to the fusion-drawn portion to the first optical fiber and for inputting the signal light to the core of the first optical fiber; an pumping light source portion for outputting the pumping light, connected on the one side with respect to the fusion-drawn portion to the second optical fiber, and for inputting the pumping light to the second optical fiber; an amplifying optical fiber connected on the other side with respect to the fusion-drawn portion to the first optical fiber and doped with a rare earth element which is brought into an excited state by the pumping light.

According to such an optical fiber amplifier, even if the signal light leaks from the core of the first optical fiber in the optical fiber coupler, input of the signal light to the pumping light source via the optical fiber coupler can be suppressed. Therefore, it is possible to suppress damage or the like to the pumping light source caused by the input of the signal light to the pumping light source.

Furthermore, it is preferable that the optical fiber amplifier described above further includes the above optical fiber coupler as a second optical fiber coupler, wherein the second optical fiber on the other side with respect to the fusion-drawn portion of the optical fiber coupler is connected to the second optical fiber on the other side with respect to the fusion-drawn portion of the second optical fiber coupler, an end portion of the amplifying optical fiber on an opposite side from a side connected to the optical fiber coupler is connected to the first optical fiber on the one side with respect to the fusion-drawn portion of the second optical fiber coupler.

According to such an optical fiber amplifier, because the pumping light is input from each end of the amplifying optical fiber, it is possible to amplify the signal light more.

According to the invention, the optical fiber coupler in which damage to the pumping light source can be suppressed even if the signal light leaks and the optical fiber amplifier using the optical fiber coupler are provided.

DETAILED DESCRIPTION OF THE INVENTION

Embodiments of an optical fiber coupler and an optical fiber amplifier of the invention will be described below in detail with reference to the drawings.

First Embodiment

First, a first embodiment of the invention will be described in detail with reference to FIGS. 1 to 4.

Figure 1:
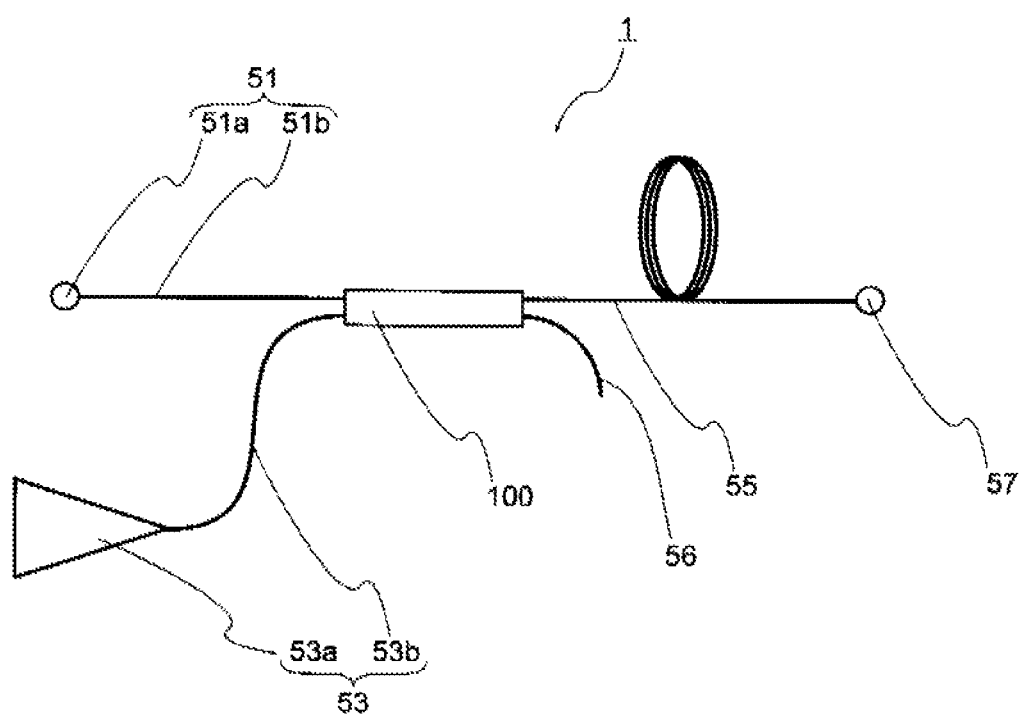
FIG. 1 is a view showing an optical fiber amplifier according to a first embodiment of the invention.

FIG. 1 is a view showing an optical fiber amplifier according to a first embodiment of the invention.

As shown in FIG. 1, the optical fiber amplifier 1 includes, as main components: an optical fiber coupler 100; a signal input portion 51 to which signal light is input and through which the signal light propagates to the optical fiber coupler 100; an pumping light source 53 from which pumping light is output and through which the output pumping light propagates to the optical fiber coupler 100; an amplifying optical fiber 55 for amplifying the signal light output from the optical fiber coupler 100; and an output portion 57 for outputting the signal light from the amplifying optical fiber 55.

The signal input portion 51 is connected to alight source (not shown) for outputting the signal light and is made up of an input terminal 51a, to which the signal light from the light source is input, and an optical fiber 51b, which is for propagation of the signal light and through which the signal light input from the input terminal 51a propagates to the optical fiber coupler 100.

The pumping light source 53 is made up of an pumping light source 53a for outputting the pumping light for amplifying the signal light, which is input from the signal input portion 51 and propagates, and an optical fiber 53b which is for propagation of the pumping light and through which the pumping light output from the pumping light source 53a propagates to the optical fiber coupler 100.

Figure 2:
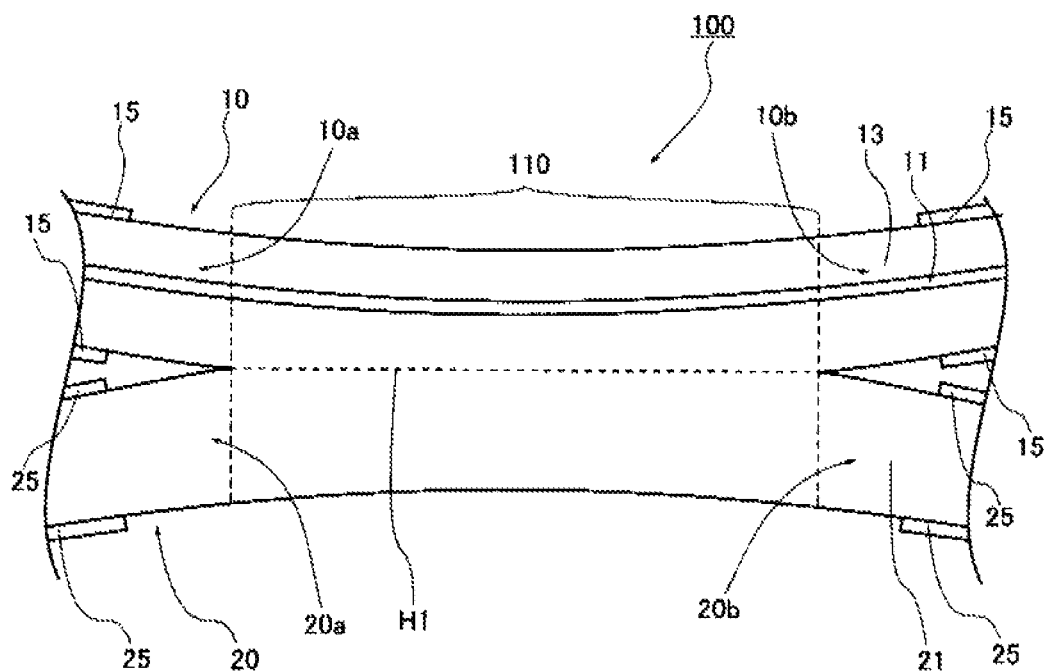
FIG. 2 is a plan view of an optical fiber coupler according to the first embodiment of the invention.
Figure 3A:
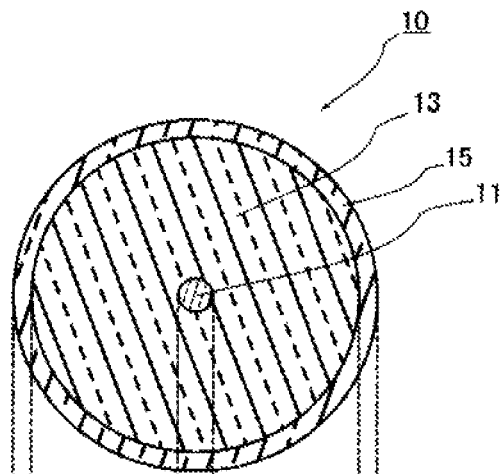
FIG. 3(A) is a view showing a structure perpendicular to a longitudinal direction of a first optical fiber and FIG. 3(B) is a diagram showing refractive index distribution.
Figure 3B:
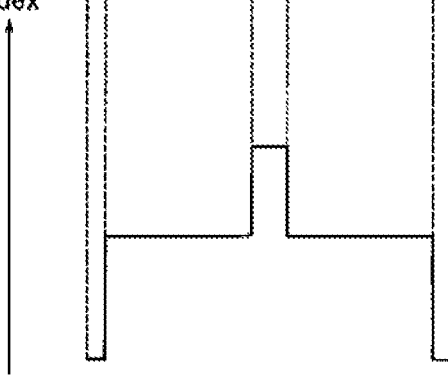
Figure 4A:
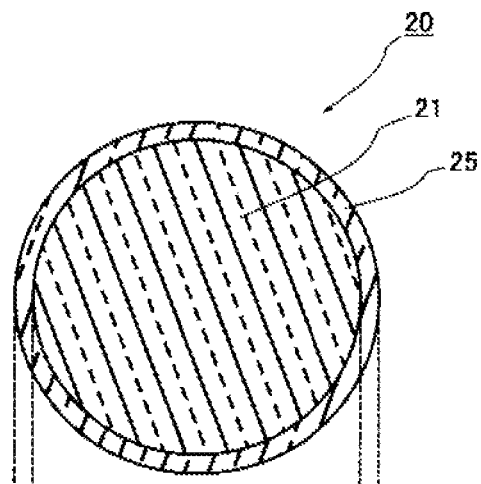
FIG. 4(A) is a view showing a structure perpendicular to a longitudinal direction of a second optical fiber and FIG. 4(B) is a diagram showing refractive index distribution.
Figure 4B:
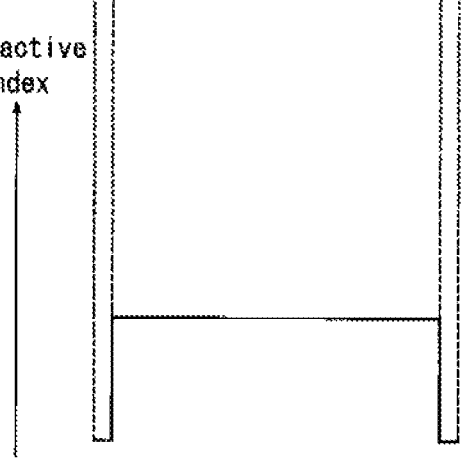

FIG. 2 is a plan view of an optical fiber coupler according to the invention. FIG. 3(A) is a view showing a structure in a section perpendicular to a longitudinal direction of a first optical fiber 10 used for the optical fiber coupler 100 shown in FIG. 2, and FIG. 3(B) is a diagram showing refractive index distribution. FIG. 4(A) is a view showing a structure in a section perpendicular to a longitudinal direction of a second optical fiber 20 used for the optical fiber coupler 100 shown in FIG. 2, and FIG. 4(B) is a diagram showing refractive index distribution.

As shown in FIG. 2, the optical fiber coupler 100 includes: the first optical fiber 10 through which the signal light and the pumping light can propagate; the second optical fiber 20 through which the pumping light can propagate; and a fusion-drawn portion 110 formed by fusing and drawing the first optical fiber 10 and the second optical fiber 20 and for inputting the pumping light propagating through the second optical fiber 20 to the first optical fiber.

First, the first optical fiber and the second optical fiber will be described.

As shown in FIG. 3(A), the first optical fiber 10 includes: a core 11 provided at a center of the first optical fiber 10; a clad 13 coating the core 11; and a plastic clad 15 coating the clad 13.

A diameter of the core 11 is not particularly limited and may be 900 to 1700 nm so that the signal light can propagate and it is particularly preferable that $\lambda_1 > 0.09 \times$(the diameter of the core 11) when a wavelength of the signal light is $\lambda_1$. In a case of the signal light used for optical communication and fiber laser, $\lambda_1$ is typically 1000 to 1650 nm.

An outer diameter of the clad 13 is 100 to 125 µm, for example, but is not particularly limited thereto. In the optical fiber amplifier used for the optical communication, if the pumping light is for amplifying the signal light, a wavelength of the pumping light is typically 900 to 1000 nm.

As shown in FIG. 3(B), the core 11 is configured to have a larger refractive index than the clad 13 so that the signal light can propagate. Here, a difference in the refractive index between the core 11 and the clad 13 is 0.2% or more from the viewpoint that the signal light can propagate as the single mode light. The plastic clad 15 is configured to have a smaller refractive index than the clad 13.

Silica ($SiO_2$) doped with metal elements such as aluminum (Al) and germanium (Ge) for increasing the refractive index may be used as a material for the core 11 of the first optical fiber. Pure silica without any dopant or silica doped with metal elements such as aluminum (Al) and germanium (Ge) for increasing the refractive index or fluorine (F) for decreasing the refractive index may be used as a material for the clad 13. Transparent resin such as acrylic ultraviolet curable resin may be used, for example, as a material for the plastic clad 15.

The second optical fiber 20 includes: a core 21; and a plastic clad 25 coating the core 21 as shown in FIG. 4(A).

A diameter of the core 21 is 100 to 125 µm, for example, but is not particularly limited thereto.

As shown in FIG. 4(B), the core 21 is configured to have a larger refractive index than the plastic clad 25 so that the pumping light can propagate.

Furthermore, the core 21 is configured to have the smaller refractive index than the clad 13 of the first optical fiber 10. A difference in the refractive index between the core 21 and the clad 13 is preferably smaller than 0.5% from the viewpoint of coupling of the pumping light.

Pure silica without any dopant or silica ($SiO_2$) doped with metal elements such as aluminum (Al) and germanium (Ge) as material for increasing the refractive index or fluorine (F) for decreasing the refractive index may be used as a material for the core 21 of the second optical fiber. Transparent resin such as acrylic ultraviolet curable resin may be used, for example, as a material for the plastic clad 25.

Next, the fusion-drawn portion 110 will be described.

As shown in FIG. 2, the fusion-drawn portion 110 is formed by fusing and drawing the first optical fiber 10 and the second optical fiber 20. Specifically, the fusion-drawn portion 110 is formed by removing part of the plastic clad 15 of the first optical fiber 10 and part of the plastic clad 25 of the second optical fiber 20, arranging the first optical fiber 10 and the second optical fiber 20 so that their longitudinal directions are in the same direction, and fusing and drawing the clad 13 of the first optical fiber 10 and the core 21 of the second optical fiber 20.

Because the clad 13 of the first optical fiber 10 and the core 21 of the second optical fiber 20 are configured to have the different refractive indices as described above, an interface H1 separating the first optical fiber 10 and the second optical fiber 20 from each other is formed in the fusion-drawn portion 110. The interface H1 is not necessarily a flat face.

In the embodiment, the fusion-drawn portion 110 is configured to have smallest width at a central portion in its longitudinal direction. The fusion-drawn portion 110 is configured to have largest width at its end portions where the first optical fiber 10 and the second optical fiber 20 branch off.

In the embodiment, one side 10a of the first optical fiber 10 with respect to the fusion-drawn portion 110 is an input side of the signal light and connected to the optical fiber 51b of the signal input portion 51 for the propagation of the signal light. The other side 10b of the first optical fiber 10 with respect to the fusion-drawn portion 110 is an output side. One side 20a of the second optical fiber 20 with respect to the fusion-drawn portion 110 is an input side of the pumping light and connected to the optical fiber 53b of the pumping light source 53 for the propagation of the pumping light. The other side 20b of the second optical fiber 20 with respect to the fusion-drawn portion 110 is an output side.

The amplifying optical fiber 55 includes: a core doped with rare earth elements; a clad coating the core; and a plastic clad coating the clad. The clad is configured to have a smaller refractive index than the core and the plastic clad is configured to have a yet smaller refractive index than the clad. The core has the same diameter as the core 11 of the first optical fiber 10, for example, and the clad has the same outer diameter as the clad 13 of the first optical fiber 10, for example. As a material forming such a core, silica doped with elements such as germanium for increasing the refractive index and rare earth elements excited by the pumping light output from the pumping light source 53a may be used, for example. Examples of such rare earth elements are ytterbium (Yb), thulium (Tm), cerium (Ce), neodymium (Nd), europium (Eu), and erbium (Er). As material forming the clad 32, pure silica without any dopant may be used, for example. As a material forming the plastic clad 33, ultraviolet curable resin may be used, for example.

One end of the amplifying optical fiber 55 is connected to the other side 10b of the first optical fiber 10 of the optical fiber coupler 100. Specifically, the first optical fiber 10 and the amplifying optical fiber 55 are connected so that the core of the amplifying optical fiber 55 is optically coupled to the core 11 of the first optical fiber 10 and that the clad of the amplifying optical fiber 55 is optically coupled to the clad 13 of the first optical fiber 10. Therefore, the signal light input from the signal input portion to the optical fiber coupler 100 and output from the other side 10b of the first optical fiber 10 is input to the amplifying optical fiber 55 and propagates through the core of the amplifying optical fiber 55. The pumping light input from the pumping light source 53 to the optical fiber coupler 100 and output from the other side 10b of the first optical fiber 10 is input to the clad of the amplifying optical fiber 55 and mainly propagates through the clad. When the pumping light passes through the core, the rare earth elements doped to the core are excited by the pumping light. If the signal light is input here, the signal light is amplified by a stimulation emission. The amplified signal light is output from the output portion 57 to the outside.

An optical fiber 56 for emitting the pumping light emits, to the outside of the amplifier, part of the pumping light propagating through the optical fiber coupler 100 which is not input to the first optical fiber 10 and is emitted from the other side 20b of the second optical fiber 20 in the optical fiber coupler 100.

According to the optical fiber coupler 100 of the embodiment, the signal light input from the signal input portion 51 to the core 11 of the first optical fiber 10 propagates through the core 11 and the pumping light input from the pumping light source 53 to the core 21 of the second optical fiber 20 propagates through the core 21. The fusion-drawn portion 110 is formed by arranging the first optical fiber 10 and the second optical fiber 20 so that their longitudinal directions are in the same direction and fusing the clad 13 of the first optical fiber 10 and the core 21 of the second optical fiber 20. The clad 13 of the first optical fiber 10 is configured to have the larger refractive index than the core 21 of the second optical fiber 20. Therefore, in the fusion-drawn portion 110, the light is liable to propagate from the second optical fiber 20 side to the first optical fiber 10 side. Consequently, the pumping light propagating through the second optical fiber 20 is liable to be input to the first optical fiber 10 and the pumping light input to the first optical fiber 10 propagates through the first optical fiber 10 and is output. On the other hand, when the light is to propagate from the first optical fiber 10 to the second optical fiber 20, the light is liable to be confined to the first optical fiber 10 side of the interface H1 between the first optical fiber 10 and the second optical fiber 20 because the clad 13 of the first optical fiber 10 has the larger refractive index than the core 21 of the second optical fiber 20. Therefore, the light is less liable to propagate from the first optical fiber 10 to the second optical fiber 20. As a result, even if the signal light propagating through the core 11 of the first optical fiber 10 leaks, input of the leaking signal light to the second optical fiber 20 is suppressed.

In this manner, even when the signal light propagating through the core 11 of the first optical fiber 10 leaks in the optical fiber coupler 100, the input of the leaking light to the second optical fiber 20 is suppressed. Therefore, the optical fiber amplifier 1 of the embodiment can suppress the input of the signal light leaking from the core 11 of the first optical fiber 10 to the pumping light source 53a via the second optical fiber 20. As a result, it is possible to suppress damage to the pumping light source 53a caused by the signal light leaking from the core 11 of the first optical fiber 10.

Second Embodiment

Next, a second embodiment of the invention will be described in detail with reference to FIGS. 5 to 7. The same components as or those equivalent to those in the first embodiment will be provided with the same reference numerals and the description thereof will not be repeated.

Figure 5:
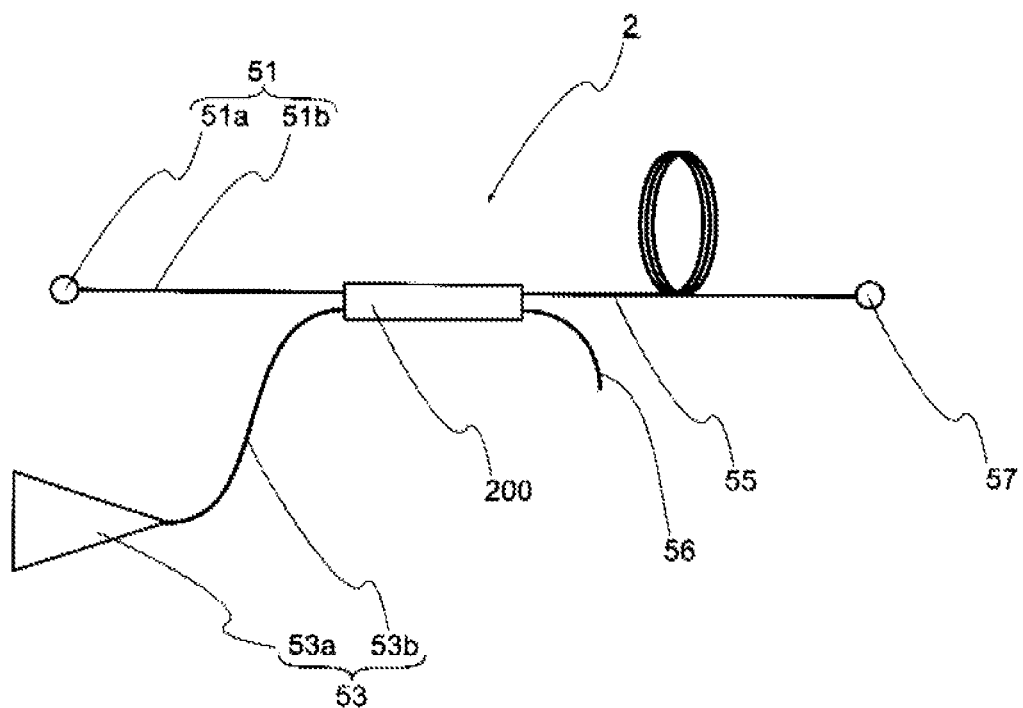
FIG. 5 is a view showing an optical fiber amplifier according to a second embodiment of the invention.

FIG. 5 is a view showing an optical fiber amplifier according to the second embodiment of the invention. As shown in FIG. 5, an optical fiber amplifier 2 is different from the optical fiber amplifier 1 in the first embodiment in that it has an optical fiber coupler 200 in place of the optical fiber coupler 100 in the first embodiment.

Figure 6:
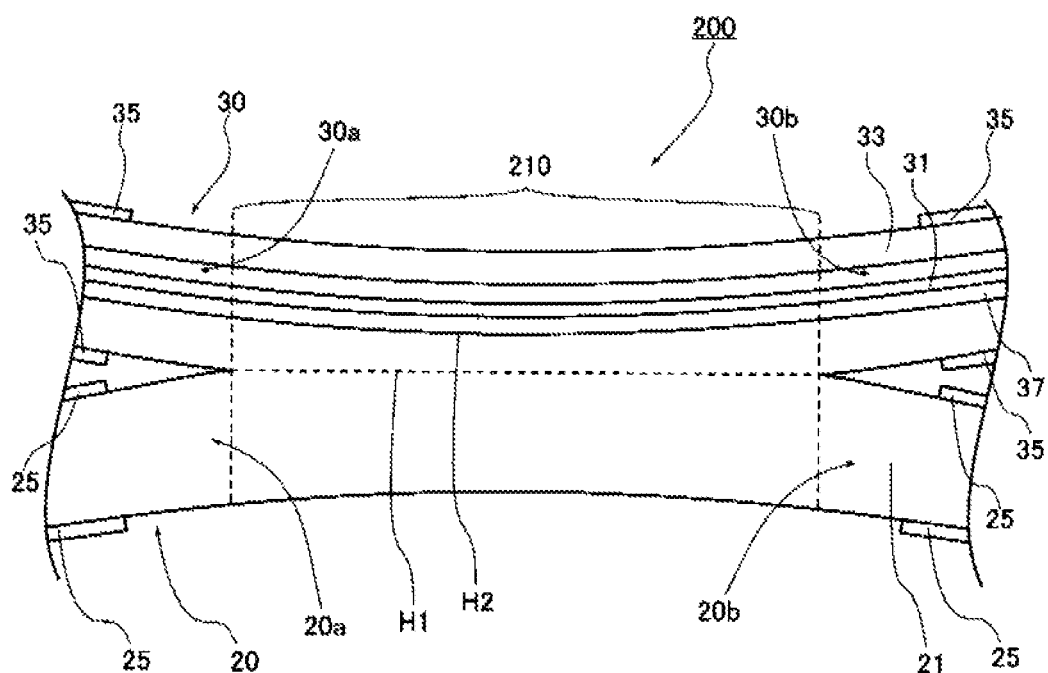
FIG. 6 is a plan view of an optical fiber coupler according to the second embodiment of the invention.
Figure 7A:
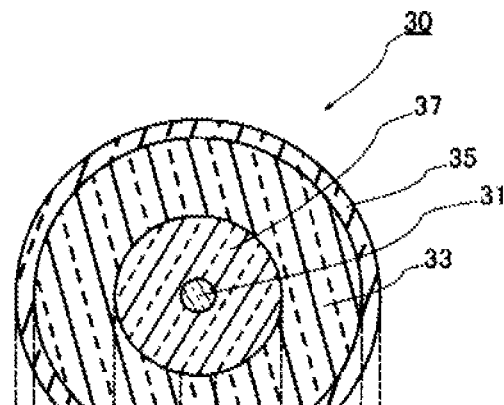
FIG. 7(A) is a view showing a structure perpendicular to a longitudinal direction of a first optical fiber and FIG. 7(B) is a diagram showing refractive index distribution.
Figure 7B:
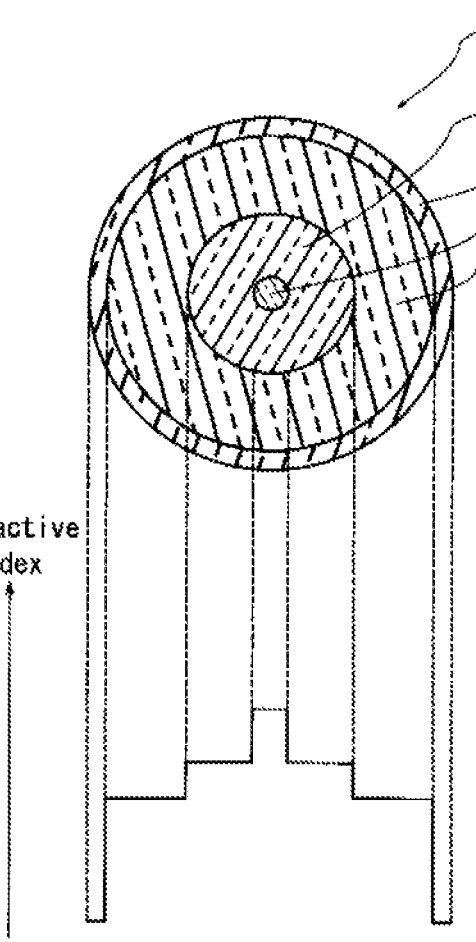

FIG. 6 is a plan view of the optical fiber coupler 200 shown in FIG. 5. FIG. 7(A) is a view showing a structure in a section perpendicular to a longitudinal direction of a first optical fiber 30 used for the optical fiber coupler 200 shown in FIG. 6, and FIG. 7(B) is a diagram showing refractive index distribution.

As shown in FIG. 6, the optical fiber coupler 200 of the embodiment includes the first optical fiber 30 through which signal light can propagate and pumping light can propagate, a second optical fiber 20 through which the pumping light can propagate, and a fusion-drawn portion 210 formed by fusing and drawing the first optical fiber 10 and the second optical fiber 20 and for inputting the pumping light propagating through the second optical fiber 20 to the first optical fiber.

As shown in FIG. 7(A), the first optical fiber 30 includes: a core 31; an inner clad 32 coating the core 31; an outer clad 33 coating the inner clad 32; and a plastic clad 35 coating the outer clad 33.

A diameter of the core 31 is not particularly limited and may be 900 to 1700 nm so that the signal light can propagate and it is particularly preferable that $\lambda_1 > 0.09 \times$(the diameter of the core 31) when a wavelength of the signal light is $\lambda_1$.

An outer diameter of the inner clad 32 is 10 to 50 μm, but is not particularly limited thereto. An outer diameter of the outer clad 33 is 10 to 125 μm, for example, but is not particularly limited thereto.

As shown in FIG. 7(B), the core 31 is configured to have a larger refractive index than the inner clad 32 so that the signal light can propagate. Here, a difference in the refractive index between the core 31 and the inner clad 32 is preferably 0.2% or more from the viewpoint that the signal light can propagate as the single mode light. The outer clad 33 is configured to have a smaller refractive index than the inner clad 32. Here, a difference in the refractive index between the inner clad 32 and the outer clad 33 is preferably 0.2% or more from the viewpoint of suppression of leakage of the light from the inner clad 32 to the outer clad 33. The plastic clad 35 is configured to have a yet smaller refractive index than the outer clad 33.

The outer clad 33 is configured to have the refractive index not smaller than that of the core 21 of the second optical fiber 20. A difference in the refractive index between the outer clad 33 and the core 21 is preferably smaller than 0.5% from the viewpoint of coupling of the pumping light. Furthermore, the outer clad 33 is more preferably configured to have the larger refractive index than the core 21 of the second optical fiber 20 to suppress leakage of the light from the first optical fiber 10 to the second optical fiber 20.

As a material for the core 31 of the first optical fiber, silica ($SiO_2$) doped with metal elements such as aluminum (Al) and germanium (Ge) for increasing the refractive index may be used. In the inner clad 32, silica is doped with aluminum or germanium to adjust the refractive index. As a material for the outer clad 33, silica doped with metal elements such as aluminum (Al) and germanium (Ge) for increasing the refractive index or fluorine (F) for decreasing the refractive index may be used. As material of the plastic clad 35, transparent resin such as acrylic ultraviolet curable resin may be used, for example.

As shown in FIG. 6, the fusion-drawn portion 210 is formed by removing part of the plastic clad 35 of the first optical fiber 30 and part of the plastic clad 25 of the second optical fiber 20, arranging the first optical fiber 30 and the second optical fiber 20 so that their longitudinal directions are in the same direction, and fusing and drawing the outer clad 33 of the first optical fiber 30 and the core 21 of the second optical fiber 20.

In the fusion-drawn portion 210, an interface H1 separating the first optical fiber 30 and the second optical fiber 20 from each other is formed. The interface H1 is not necessarily a flat face. In the first optical fiber 30, an interface H2 is formed between the inner clad 32 and the outer clad 33.

In the embodiment, one side 30a of the first optical fiber 30 with respect to the fusion-drawn portion 210 is an input side of the signal light and connected to the optical fiber 51b of the signal input portion 51 for the propagation of the signal light. The other side 30b of the first optical fiber 30 with respect to the fusion-drawn portion 210 is an output side and connected to the amplifying optical fiber 55. Specifically, the first optical fiber 10 and the amplifying optical fiber 55 are connected so that the core of the amplifying optical fiber 55 is optically coupled to the core 31 of the first optical fiber 30 and that the clad of the amplifying optical fiber 55 is optically coupled to the inner clad 32 and the outer clad 33 of the first optical fiber 10.

According to the optical fiber coupler 200 of the embodiment, the fusion-drawn portion 210 is formed by arranging the first optical fiber 30 and the second optical fiber 20 so that their longitudinal directions are in the same direction and fusing the outer clad 33 of the first optical fiber 30 and the core 21 of the second optical fiber 20. The outer clad 33 of the first optical fiber 30 is configured to have the refractive index not smaller than that of the core 21 of the second optical fiber 20. Therefore, the light is liable to propagate from the second optical fiber 20 to the first optical fiber 30. Consequently, the pumping light propagating through the second optical fiber 20 is liable to be input to the first optical fiber 30 and the pumping light input to the first optical fiber 30 propagates through the first optical fiber 30. On the other hand, the inner clad 32 is configured to have the larger refractive index than the outer clad 33 in the first optical fiber 30. Therefore, even if the signal light propagating through the first optical fiber 30 leaks from the core 31, the leaking light is liable to be confined to the inner clad 32 side of the interface H2 between the inner clad 32 and the outer clad 33 in the first optical fiber 30 and propagation from the inner clad 32 to the outer clad 33 in the first optical fiber 30 is suppressed. Because propagation of the signal light leaking from the core 31 to the outer clad 33 is suppressed in this manner, input of the signal light leaking from the core 31 to the second optical fiber 20 is suppressed. Therefore, input of the signal light leaking from the core 31 of the first optical fiber 30 to the pumping light source 53a via the second optical fiber 20 is suppressed. As a result, it is possible to suppress damage to the pumping light source 53a caused by the signal light leaking from the core 31 of the first optical fiber 31.

Moreover, even when part of the signal light leaking from the core 31 propagates to the outer clad 33, the leaking light is liable to be confined to the first optical fiber 30 side of the interface H1 between the first optical fiber 30 and the second optical fiber 20 and leakage to the second optical fiber 20 is suppressed, if the outer clad 33 has the larger refractive index than the core 21 of the second optical fiber 20.

Third Embodiment

Next, a third embodiment of the invention will be described in detail with reference to FIG. 8. The same components as or those equivalent to those in the first embodiment will be provided with the same reference numerals and the description thereof will not be repeated.

Figure 8:
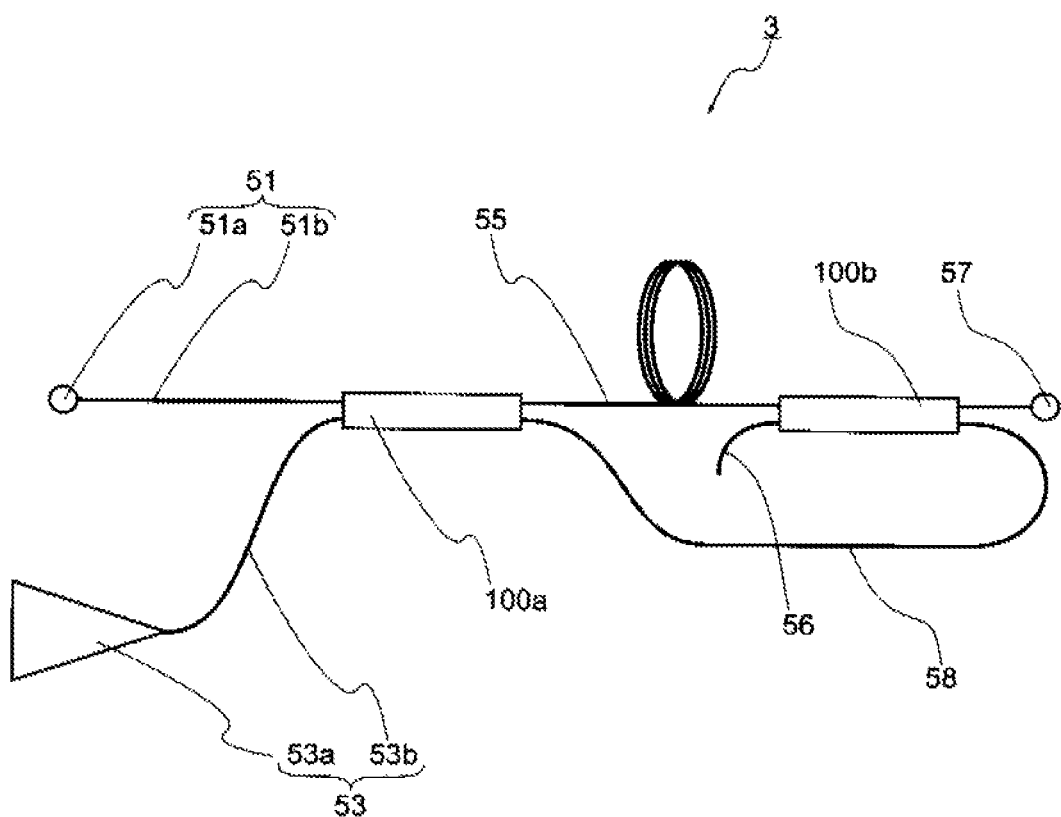
FIG. 8 is a view showing an optical fiber amplifier according to a third embodiment of the invention.

FIG. 8 is a view showing an optical fiber amplifier according to the third embodiment of the invention. As shown in FIG. 8, an optical fiber amplifier 3 is different from the optical fiber amplifier 1 in the first embodiment in that it has optical fiber couplers 100a and 100b having the similar structures to the optical fiber coupler 100 shown in FIG. 1.

As shown in FIG. 8, in the optical fiber coupler 100a, one side 10a of a first optical fiber 10 with respect to a fusion-drawn portion 110 is an input side of signal light. An optical fiber 51b of a signal input portion 51 for propagation of the signal light is connected to the optical fiber coupler 100a on the one side 10a of the first optical fiber 10 with respect to the fusion-drawn portion 110. The other side 10b of the first optical fiber 10 with respect to the fusion-drawn portion 110 is an output side and connected to an amplifying optical fiber 55.

In the optical fiber coupler 100a, one side 20a of a second optical fiber 20 with respect to the fusion-drawn portion 110 is an input side of pumping light. An optical fiber 53b of the pumping light source 53 for propagation of the pumping light is connected to the optical fiber coupler 100a on the one side 20a of the second optical fiber 20 with respect to the fusion-drawn portion 110. The other side 20b of the second optical fiber 20 with respect to the fusion-drawn portion 110 is an output side and connected to an optical fiber 58 for propagation of the pumping light. The optical fiber 58 for the propagation of the pumping light has a similar structure to the optical fiber 53 for the propagation of the pumping light.

In the optical fiber coupler 100b, one side 10a of the first optical fiber 10 with respect to the fusion-drawn portion 110 is an input side of the signal light. An end portion of the amplifying optical fiber 55 on an opposite side from a side connected to the optical fiber coupler 100a is connected to the optical fiber coupler 100b on the one side 10a of the first optical fiber 10. The other side 10b of the first optical fiber 10 with respect to the fusion-drawn portion 110 is an output side and connected to an output portion 57. Therefore, the signal light amplified in the amplifying optical fiber 55 is input to the optical fiber coupler 100b and is output from the output portion 57.

In the optical fiber coupler 100b, the other side 20b of the second optical fiber 20 with respect to the fusion-drawn portion 110 is an input side of pumping light. An end portion of the optical fiber 58 for propagation of the pumping light on an opposite side from a side connected to the optical fiber coupler 100a is connected to the optical fiber coupler 100b on the other side 20b of the second optical fiber 20.

In such an optical fiber amplifier 3, the pumping light that has not been input from the second optical fiber 20 to the first optical fiber 10 in the optical fiber coupler 100a is input to the optical fiber coupler 100b via the optical fiber 58 for the propagation of the pumping light. The pumping light input to the optical fiber coupler 100b is input to the first optical fiber 10 in the optical fiber coupler 100b and output from the one side 10a of the first optical fiber 20 with respect to the fusion-drawn portion 110 of the optical fiber coupler 100b. Because the amplifying optical fiber 55 is connected to the one side 10a of the first optical fiber 20, the pumping light is input to the amplifying optical fiber 55. In other words, the pumping light is input to the amplifying optical fiber 55 from each of the optical fiber coupler 100a and the optical fiber coupler 100b. Therefore, more intense pumping light is input to the amplifying optical fiber 55. As a result, the signal light is further amplified in the amplifying optical fiber 55.

The pumping light that has not been input from the second optical fiber 20 to the first optical fiber 10 in the optical fiber coupler 100b is emitted from the optical fiber 56 for emitting the pumping light.

Although the embodiments of the invention have been described above, the invention is not limited to the embodiments.

For example, in the first embodiment, the core 11 of the first optical fiber 10 may be doped with the rare earth elements and the amplifying optical fiber 55 and the first optical fiber 10 may have the same structures. In this case, the amplifying optical fiber 55 may be made up of an extension portion formed by extending the first optical fiber 10. In this way, a junction is not formed between the first optical fiber 10 of the optical fiber coupler 100 and the amplifying optical fiber 55 and a loss of light is suppressed. Therefore, losses of signal light and the pumping light can be reduced. As a result, it is possible to more efficiently amplify the signal light.

In addition, in the first embodiment, the optical fiber 51b for the propagation of the signal light may have the same structure as the amplifying optical fiber 55. In this case, the optical fiber 51b for the propagation of the signal light may be made up of the extension portion extending from the first optical fiber 10 to an opposite side from the amplifying optical fiber 55. In this case, no junction is formed between the input end and the output end and therefore the loss of the signal light can be further reduced. Further in this case, the single optical fiber without the junction between the input end and the output end can be used and therefore the optical fiber amplifier 1 can be manufactured at low cost.

If the first optical fiber 10 and the amplifying optical fiber 55 do not have the same structures, the first optical fiber 10 and the optical fiber 51b for the propagation of the signal light may have the same structures and the extension portion formed by extending the first optical fiber 10 may be used as the optical fiber 51b for the propagation of the signal light.

Similarly, in the second embodiment, the core 31 of the first optical fiber 30 may be doped with the rare earth elements and the amplifying optical fiber 55 and the first optical fiber 30 may have the same structures. In this case, the amplifying optical fiber 55 may be made up of the extension portion formed by extending the first optical fiber 30. In addition, the optical fiber 51b for the propagation of the signal light may have the same structure as the amplifying optical fiber 55. In this case, the optical fiber 51b for the propagation of the signal light may be made up of the extension portion formed by extending the first optical fiber 30 to an opposite side from the amplifying optical fiber 55.

Similarly, in the third embodiment, the cores 11 of the first optical fibers 10 in the optical fiber couplers 100a and 100b may be doped with the rare earth elements and the amplifying optical fiber 55 and the first optical fiber 30 may have the same structures. In this case, the amplifying optical fiber 55 may be made up of the extension portion formed by extending the first optical fiber 10 in the optical fiber coupler 100a and the extension portion formed by extending the amplifying optical fiber 55 may be used as the first optical fiber 10 in the optical fiber coupler 100b.

In the first and second embodiments, the second optical fiber 20 and the optical fiber 53b for the propagation of the pumping light may have the same structures. In this case, the extension portion extending from the second optical fiber 20 may be used as the optical fiber 53b for the propagation of the pumping light. In this way, a junction is not formed between the second optical fiber 20 and the optical fiber 53b for the propagation of the pumping light and a loss of the pumping light is suppressed. Therefore, more intense pumping light can be input to the optical fiber coupler 100. As a result, it is possible to more efficiently amplify the signal light.

In addition, in the first and second embodiments, the optical fiber 56 for emitting the pumping light may have the same structure as the second optical fiber. In this case, the extending portion formed by extending the second optical fiber 20 in an opposite direction from the optical fiber 53b for the propagation of the pumping light may be formed as the optical fiber 56 for emitting the pumping light. In this way, the second optical fiber 20 and the optical fiber 56 for emitting the pumping light can be made up of the single optical fiber without the junction and therefore the optical fiber amplifier 1 can be manufactured at low cost.

In the third embodiment, the second optical fiber 20 and the optical fiber 53b for the propagation of the pumping light in the optical fiber coupler 100a may have the same structures. In this case, the extension portion formed by extending the second optical fiber 20 may be used as the optical fiber 53b for the propagation of the pumping light. In addition, the optical fiber 58 for the propagation of the pumping light, the second optical fiber 20 in the optical fiber coupler 100b, and the optical fiber 56 for emitting the pumping light may have the same structures as the second optical fiber 20 in the optical fiber coupler 100a. In this way, the single optical fiber can be used between optical fiber 53b for the propagation of the pumping light to the optical fiber 56 for emitting the pumping light without forming the junction.

In the second optical fiber 20, a core which is for a single mode and through which single mode light can propagate may be provided at a center of the core 21.

In the second embodiment, a third clad may be interposed between the core and the inner clad or between the inner clad and the outer clad of the first optical fiber.

Although the third embodiment includes the optical fiber couplers 100a and 100b having the same structures as the optical fiber coupler 100, optical fiber couplers having the same structures as the optical fiber coupler 200 may be used in place of the optical fiber couplers 100a and 100b.

EXAMPLES

The invention will be described below more concretely by using examples and comparative examples, but the invention is not limited thereto.

Examples 1 to 5

First, while fixing drawing length of the fusion-drawn portion and changing the smallest width of the fusion-drawn portion, a rate at which the signal light leaking from the first optical fiber was input to the second optical fiber was measured.

First, the same first optical fibers and second optical fibers were prepared for the examples 1 to 5. The first optical fiber had a core, an inner clad coating the core, an outer clad coating the inner clad, and a plastic clad coating the outer clad. The second optical fiber had a core and a plastic clad coating the core.

The core of the first optical fiber had a diameter of 10 μm and was doped with 6.8 mol % of germanium. The inner clad had an outer diameter of 35 μm and was doped with 3.4 mol % of germanium. In this way, a refractive index of the inner clad was set to be 0.35% lower than that of the core. The outer clad had an outer diameter of 125 μm and silica glass without any dopant was used for the outer clad. In this way, a refractive index of the outer clad was set to be 0.35% lower than that of the inner clad. The plastic clad was made of ultraviolet curable resin and had an outer diameter of 150 μm and a refractive index set to be 0.5% lower than that of the outer clad.

The core of the second optical fiber had a diameter of 125 μm and silica glass without any dopant was used for the core of the second optical fiber. In this way, refractive indices of the outer clad of the first optical fiber and the core of the second optical fiber were set to be equal to each other. The plastic clad was made of ultraviolet curable resin and had an outer diameter of 150 μm and a refractive index set to be 0.6% lower than that of the second core.

Next, in each of the examples 1 to 5, part of the plastic clad of the first optical fiber and part of the plastic clad of the second optical fiber were removed respectively and a portion of the first optical fiber from which the plastic clad was removed and a portion of the second optical fiber from which the plastic clad was removed were fused and drawn by using an oxyhydrogen burner to form an optical fiber coupler. Length of a fusion-drawn portion at this time was 5 mm and the smallest width of the fusion-drawn portion was a value shown in Table 1.

Comparative Examples 1 to 5

Next, the same first optical fiber and second optical fiber were prepared for each of the respective comparative examples 1 to 5. The first optical fiber had a core, a clad coating the core, and a plastic clad coating the clad. The second optical fiber was the same optical fiber as that in the example 1.

The core of the first optical fiber had a diameter of 10 μm and was doped with 6.8 mol % of germanium. The clad had an outer diameter of 125 μm and silica glass without any dopant was used to form the clad. In this way, a refractive index of the clad was set to be 0.75% lower than that of the core. The refractive index of the clad at this time was set to be equal to that of the core of the second optical fiber. The plastic clad was made of ultraviolet curable resin and had an outer diameter of 150 μm and a refractive index set to be 0.5% lower than that of the outer clad.

Next, in each of the comparative examples 1 to 5, part of the plastic clad of the first optical fiber and part of the plastic clad of the second optical fiber were removed respectively and a portion of the first optical fiber from which the plastic clad was removed and a portion of the second optical fiber from which the plastic clad was removed were fused and drawn by using an oxyhydrogen burner to form an optical fiber coupler. Length of a fusion-drawn portion at this time was 5 mm and the smallest width of the fusion-drawn portion was a value shown in Table 1.

TABLE 1

|  | Smallest width of fusion-drawn portion (μm) | Rate X (%) |  | Smallest width of fusion-drawn portion (μm) | Rate X (%) |
| --- | --- | --- | --- | --- | --- |
| Example 1 | 225 | 0.07 | Comparative Example 1 | 225 | 0.81 |
| Example 2 | 200 | 0.11 | Comparative Example 2 | 200 | 1.57 |
| Example 3 | 175 | 0.22 | Comparative example 3 | 175 | 2.84 |
| Example 4 | 150 | 0.37 | Comparative Example 4 | 150 | 4.48 |
| Example 5 | 125 | 0.70 | Comparative Example 5 | 125 | 7.73 |

Next, in the optical fiber coupler in each of the examples 1 to 5 and the comparative examples 1 to 5, signal light having a center wavelength of 1032 nm and intensity of 10 mW was input to the core of the first optical fiber and pumping light having a center wavelength of 975 nm and intensity of 4 W was input to the second core of the second optical fiber. At this time, the signal light had such a wavelength as to propagate through the first optical fiber as single mode light and the pumping light had such a wavelength as to propagate through the second optical fiber and the first optical fiber as multimode light.

A rate at which the signal light was input to the second optical fiber in the fusion-drawn portion at this time is shown in Table 1. As shown in Table 1, it has been shown that the rate X at which the signal light was input to the second optical fiber was suppressed to 0.7% or less in the optical fiber coupler in each of the examples 1 to 5. Comparing the examples and the comparative examples having the same smallest width of the fusion-drawn portion with each other, it has been shown that the rate X at which the signal light was input to the second optical fiber in each of the comparative examples 1 to 5 was more than 10 times higher than that in each of the examples 1 to 5.

Examples 6 to 10

Next, while fixing the smallest width of the fusion-drawn portion and changing the drawn length of the fusion-drawn portion, the rate at which the signal light leaking from the first optical fiber was input to the second optical fiber was measured.

Examples 6 to 10 were similar to the example 1 except that the smallest width of the fusion-drawn portion was 225 μm and that the drawn lengths were values shown in Table 2.

Comparative Examples 6 to 10

Comparative examples 6 to 10 were similar to the comparative example 1 except that the smallest width of the fusion-drawn portion was 225 μm and that the drawn lengths were values shown in Table 2.

TABLE 2

|  | Drawn length of fusion-drawn portion (μm) | Rate X (%) |  | Drawn length of fusion-drawn portion (μm) | Rate X (%) |
| --- | --- | --- | --- | --- | --- |
| Example 6 | 10 | 0.11 | Comparative example 6 | 10 | 1.27 |
| Example 7 | 15 | 0.15 | Comparative | 15 | 1.80 |

TABLE 2-continued

| | Drawn length of fusion-drawn portion (μm) | Rate X (%) | | Drawn length of fusion-drawn portion (μm) | Rate X (%) |
|---|---|---|---|---|---|
| Example 7 | | | example 7 | | |
| Example 8 | 20 | 0.21 | Comparative example 8 | 20 | 2.49 |
| Example 9 | 25 | 0.30 | Comparative example 9 | 25 | 3.46 |
| Example 10 | 30 | 0.42 | Comparative example 10 | 30 | 4.97 |

Next, the same signal light and pumping light as those in the example 1 were input to each of the examples 6 to 10 and the comparative examples 6 to 10. The rate X at which the signal light was input to the second optical fiber in the fusion-drawn portion at this time is shown in Table 2. As shown in Table 2, it has been shown that the rate X at which the signal light was input to the second optical fiber was suppressed to 0.42% or less in the optical fiber coupler in each of the examples 6 to 10. Comparing the examples and the comparative examples having the same drawn length of the fusion-drawn portion with each other, it has been shown that the rate X at which the signal light was input to the second optical fiber in each of the comparative examples 6 to 10 is more then 10 times higher than that in each of the examples 6 to 10.

Consequently, it is believed that the signal light leaking from the core did not propagate from the inner clad to the outer clad in the examples 1 to 10 because the refractive index of the inner clad was larger than that of the outer clad in the first optical fiber. On the other hand, it is believed that the signal light leaking from the core of the first optical fiber was liable to be input to the second optical fiber in the comparative examples 1 to 10 because there was no difference in the refractive index between the clad of the first optical fiber and the core of the second optical fiber.

Moreover, it has been found that the input of the signal light to the second optical fiber was suppressed when the signal light leaked from the core of the first optical fiber according to the optical fiber coupler of the invention. Therefore, by using the optical fiber coupler of the invention, it is believed to be possible to achieve the optical fiber amplifier in which damage to the pumping light source is suppressed.

Example 11

Next, an optical fiber coupler was formed similarly to the example 1 except that a drawn length of the fusion-drawn portion was 15 mm and a smallest width of the fusion-drawn portion was 200 μm. This optical fiber coupler was used to form an optical fiber amplifier similar to that in the first embodiment. As an amplifying optical fiber, an optical fiber having a length of 8 m was used. A diameter of a core was 10 μm and an outer diameter of a clad was 125 μm. As the core, silica doped with 2.3 mol % of aluminum and doped with ytterbium so that an absorptance of the clad was 4 dB/m was used. As the clad, silica glass without any dopant was used. Signal light having center wavelength of 1032 nm and intensity of 10 mW was input to such an optical fiber amplifier and pumping light having the center wavelength of 975 nm and intensity of 4 W was output from the pumping light source. As a result, signal light having intensity of 550 mW could be output from the output portion and the light could be amplified by 17 dB. Moreover, the long-time output did not damage the pumping light source and the stable output could be obtained.

Example 12

Next, An optical fiber coupler similar to that in the example 11 and an amplifying optical fiber were prepared to form an optical fiber amplifier similar to that in the third embodiment. To this optical fiber amplifier, signal light and pumping light similar to those in the example 11 were input. As a result, signal light having intensity of 1000 mW could be output from an output portion. Furthermore, the long-time output did not damage the pumping light source and the stable output could be obtained.

Consequently, it has been shown that the damage to the pumping light source could be suppressed in the optical fiber amplifier of the invention.

INDUSTRIAL APPLICABILITY

According to the invention, there are provided an optical fiber coupler in which the damage to the pumping light source can be suppressed even if the signal light leaks and an optical fiber amplifier using the optical fiber coupler.

The invention claimed is:
1. An optical fiber coupler comprising:
a first optical fiber having a core, an inner clad coating the core, and an outer clad coating the inner clad and having a smaller refractive index than the inner clad, signal light being capable of propagating through the core and pumping light being capable of propagating through the inner clad and the outer clad;
a second optical fiber having a core, the pumping light being capable of propagating through the core as multi-mode light; and
a fusion-drawn portion formed by arranging the first optical fiber and the second optical fiber so that their longitudinal directions are in the same direction and fusing the outer clad of the first optical fiber and the core of the second optical fiber,
wherein, in a predetermined length along a longitudinal direction of the fusion-drawn portion, width of the first optical fiber and width of the second optical fiber respectively become gradually smaller from one longitudinal end of the fusion-drawn portion toward a center of the fusion-drawn portion, and
wherein the outer clad of the first optical fiber has a refractive index not smaller than that of the core of the second optical fiber.
2. The optical fiber coupler according to claim 1, wherein the outer clad of the first optical fiber has a larger refractive index than the core of the second optical fiber.
3. An optical fiber amplifier comprising:
the optical fiber coupler according to claim 1;
an input portion connected on one side with respect to the fusion-drawn portion to the first optical fiber and for inputting the signal light to the core of the first optical fiber;
a pumping light source portion for outputting the pumping light, connected on the one side with respect to the fusion-drawn portion to the second optical fiber, and for inputting the pumping light to the second optical fiber;
an amplifying optical fiber connected on the other side with respect to the fusion-drawn portion to the first optical fiber and doped with a rare earth element which is brought into an excited state by the pumping light.
4. An optical fiber amplifier comprising:
optical fiber coupler according to claim 1 and a second optical fiber coupler according to claim 1;

an input portion connected to the first optical fiber of the first coupler on one side with respect to the fusion-drawn portion of the first coupler and for inputting the signal light to the core of the first optical fiber;

a pumping light source portion for outputting the pumping light, connected the second optical fiber of the first coupler on the one side with respect to the fusion-drawn portion of the first coupler, and for inputting the pumping light to the second optical fiber; and an amplifying optical fiber connected to the first optical fiber of the first coupler on the other side with respect to the fusion-drawn portion of the first coupler and doped with a rare earth element which is brought into an excited state by the pumping light, wherein the second optical fiber on the other side with respect to the fusion-drawn portion of the first coupler is connected to the second optical fiber of the second coupler on the other side with respect to the fusion-drawn portion of the second coupler, an end portion of the amplifying optical fiber on an opposite side from a side connected to the first coupler is connected to the first optical fiber of the second coupler on the one side with respect to the fusion-drawn portion of the second coupler.

5. An optical fiber amplifier comprising:

the optical fiber coupler according to claim 2;

an input portion connected on one side with respect to the fusion-drawn portion to the first optical fiber and for inputting the signal light to the core of the first optical fiber;

a pumping light source portion for outputting the pumping light, connected on the one side with respect to the fusion-drawn portion to the second optical fiber, and for inputting the pumping light to the second optical fiber;

an amplifying optical fiber connected on the other side with respect to the fusion-drawn portion to the first optical fiber and doped with a rare earth element which is brought into an excited state by the pumping light.

6. An optical fiber amplifier comprising:

optical fiber coupler according to claim 2 and a second optical fiber coupler according to claim 2;

an input portion connected to the first optical fiber of the first coupler on one side with respect to the fusion-drawn portion of the first coupler and for inputting the signal light to the core of the first optical fiber;

a pumping light source portion for outputting the pumping light, connected the second optical fiber of the first coupler on the one side with respect to the fusion-drawn portion of the first coupler, and for inputting the pumping light to the second optical fiber; and an amplifying optical fiber connected to the first optical fiber of the first coupler on the other side with respect to the fusion-drawn portion of the first coupler and doped with a rare earth element which is brought into an excited state by the pumping light, wherein the second optical fiber on the other side with respect to the fusion-drawn portion of the first coupler is connected to the second optical fiber of the second coupler on the other side with respect to the fusion-drawn portion of the second coupler, an end portion of the amplifying optical fiber on an opposite side from a side connected to the first coupler is connected to the first optical fiber of the second coupler on the one side with respect to the fusion-drawn portion of the second coupler.

7. The optical fiber coupler according to claim 1, wherein the width of the first optical fiber and the width of the second optical fiber respectively become gradually smaller from an opposite longitudinal end of the fusion-drawn portion toward the center of the fusion-drawn portion in a predetermined length along the longitudinal direction of the fusion-drawn portion, the opposite longitudinal end being opposite to the one longitudinal end of the fusion-drawn portion.

8. The optical fiber coupler according to claim 1, wherein the first optical fiber is bent in an arc shape throughout the entire length of the fusion-drawn portion and the second optical fiber is bent in an arc shape throughout the entire length of the fusion-drawn portion.

9. The optical fiber coupler according to claim 1, wherein the fusion-drawn portion includes the smallest width at a central portion in the longitudinal direction and the largest width at longitudinal ends of the fusion-drawn portion from which the first optical fiber and the second optical fiber branch off.

10. The optical fiber coupler according to claim 1, wherein the outer clad of the first optical fiber and the core of the second optical fiber are fused with each other to have a flat interface therebetween throughout the entire length of the fusion-drawn portion.

11. The optical fiber coupler according to claim 9, wherein the outer clad of the first optical fiber and the core of the second optical fiber are fused with each other to have a flat interface therebetween throughout the entire length of the fusion-drawn portion.

* * * * *